(12) United States Patent
Cattin et al.

(10) Patent No.: US 7,701,560 B2
(45) Date of Patent: Apr. 20, 2010

(54) DISPLACEMENT SPEED MEASUREMENT METHOD

(75) Inventors: Viviane Cattin, Saint Egreve (FR); Bernard Guilhamat, Saint Michel de Saint Geoirs (FR); Rosolino Lionti, Seyssins (FR)

(73) Assignee: Commissariat a l'Energie Atomique, Paris (FR)

( * ) Notice: Subject to any disclaimer, the term of this patent is extended or adjusted under 35 U.S.C. 154(b) by 171 days.

(21) Appl. No.: 11/989,233

(22) PCT Filed: Jul. 27, 2006

(86) PCT No.: PCT/FR2006/001843

§ 371 (c)(1), (2), (4) Date: Jan. 23, 2008

(87) PCT Pub. No.: WO2007/020339

PCT Pub. Date: Feb. 22, 2007

(65) Prior Publication Data

US 2009/0119058 A1 May 7, 2009

(30) Foreign Application Priority Data

Aug. 16, 2005 (FR) .................................. 05 08569

(51) Int. Cl.
*G01P 3/36* (2006.01)

(52) U.S. Cl. ........................................ 356/28; 356/28.5
(58) Field of Classification Search .......... 356/3.01–22, 356/28, 28.5
See application file for complete search history.

(56) References Cited

U.S. PATENT DOCUMENTS

| 6,118,132 | A | 9/2000 | Tullis | |
|---|---|---|---|---|
| 6,823,077 | B2 | 11/2004 | Dietz et al. | |
| 2002/0077752 | A1* | 6/2002 | Burreson et al. | 701/300 |
| 2002/0199164 | A1 | 12/2002 | Sengupta et al. | |
| 2005/0202893 | A1* | 9/2005 | Otten et al. | 473/219 |

FOREIGN PATENT DOCUMENTS

FR 2 749 086 A1 11/1997

* cited by examiner

*Primary Examiner*—Thomas H Tarcza
*Assistant Examiner*—Luke D Ratcliffe
(74) *Attorney, Agent, or Firm*—Oliff & Berridge, PLC

(57) ABSTRACT

The measurement method of the displacement speed of a moving element with respect to a fixed element is performed by means of an optic measuring device comprising a first reference sensor and a plurality of distinct second measurement sensors substantially aligned along the axis of movement of the moving element. The measurement method comprises determination of estimated speeds by correlation of the signals supplied by the reference sensor and each of the measurement sensors, and calculation of a mean speed of said estimated speeds.

7 Claims, 4 Drawing Sheets

DISPLACEMENT SPEED MEASUREMENT METHOD

BACKGROUND OF THE INVENTION

The invention relates to method for measuring the displacement speed of a moving element with respect to a fixed element by means of an optic measuring device fixed to one of the two elements and comprising means for emitting at least one incident light beam in the direction of the other element, first and second sensors detecting the light diffused by the other element, and processing means connected to said sensors, the measurement method comprising at least:
- emission of the incident light beam,
- detection of the light diffused by said first and second sensors,
- determination, by the processing means, of the position of the maximum correlation peak by correlation of the signals supplied by the first and second sensors,
- determination of an estimated speed according to the predetermined distance between the first and second sensors and said position of the maximum correlation peak.

STATE OF THE ART

To measure the displacement speed of a moving element with respect to a fixed element, for example the longitudinal displacement speed of a motor vehicle on the ground, an optic measuring device using optic correlation measurement is conventionally used. As represented very schematically in FIG. 1, the measuring device, fixed for example under the body of the vehicle, is in movement along the displacement axis A. The measuring device conventionally comprises means (not shown) for emitting at least one incident light beam in the direction of the ground, a first reference sensor R located towards the front of the vehicle and a second measurement sensor M located towards the rear of the vehicle. The two sensors R and M are designed to detect the light diffused by the ground. The measuring device also comprises processing means connected to sensors R and M and designed to determine the vehicle displacement speed, the distance D between reference sensor R and measurement sensor M being known.

A displacement speed measurement method using such an optic measuring device comprises at least:
- emission of the incident light beam onto the ground,
- detection, by first sensor R and second sensor M, of the light diffused by the ground,
- determination, by the processing means, of the position of the maximum correlation peak, for example by correlation of the signals supplied by sensors R and M,
- determination of an estimated displacement speed Ve, according to the predetermined distance D separating reference sensor R and measurement sensor M and to said position of the maximum correlation peak.

To preserve a good precision in determining the position of the maximum correlation peak, it is preferable to control the acquisition frequency Fe of the signals received by sensors R and M, which is also the correlation function sampling frequency. Controlling this frequency enables the maximum correlation peak to be always set around the index n corresponding to a point of the correlation function and defined by the equation $n = \tau \times Fe$, wherein $\tau$ is the lag time and Fe the sampling frequency.

However, $\tau = D/Ve$ and $Fe = Ve/\delta$, Ve being the estimated speed and $\delta$ the spatial resolution of the measuring device. Index n is then expressed according to the following formula: $n = D/\delta$. Index n is therefore a constant independent from the speed Ve. Whatever the estimated speed Ve, the maximum correlation peak is always situated at this point n.

However, for very high displacement speeds, or for very low spatial resolutions $\delta$, the technological limit of the measuring device may be reached. For example, measurement sensor M is a photodiode array of 64 elementary components, or pixels, with a 2.5 MHz clock and the maximum acquisition frequency rate is 40 kHz. As represented in FIG. 2 illustrating speed V in km/h versus the spatial resolution $\delta$ in mm, for the 10 kHz, 20 kHz, 30 kHz, 40 kHz, 50 kHz, 60 kHz, 70 kHz, 100 kHz and 150 kHz signal acquisition frequencies, the maximum frequency of 40 kHz is reached as from 150 km/h, for a required spatial resolution of 1 mm. Such a measurement method therefore does not enable measurements to be made at high speeds, according to the required spatial resolution.

Moreover, when the acquisition frequency is constant, maximum correlation peak index n decreases when the speed increases. This results in a loss of precision in determining the estimated speed. This results for example in large variations in the measurements, leading to a large imprecision, in particular when recording a speed gradient (FIG. 3).

As represented in FIG. 3 illustrating speed V in km/h versus time t, with a maximum acquisition frequency of 9 kHz and a spatial resolution of 1.5 mm, recording of the speed gradient of a vehicle is not precise, for at each measurement moment, the estimated speed value varies greatly. For example, the precision linked to sampling at a speed of 110 km/h is about 4 km/h.

In general manner, the imprecision of the measurements described above stems from sub-sampling of the correlation function, which leads to a large imprecision in determining the position of the maximum correlation peak. To remedy these shortcomings, several measurement techniques have been proposed, in particular by the documents US 2002/0199164 concerning printed circuit positioning applications, and U.S. Pat. No. 6,823,077 concerning optic mouses.

A first method consists in using interpolation techniques. A first example proposes interpolation of the position of the maximum correlation peak by conventional techniques, i.e. polynomial, barycenter, spline, cubic, etc, on the two, three or four samples close to the one which presents the greatest amplitude. However, the shape of the maximum correlation peak may be far from that of the mathematical object described by the interpolation equations. For example, polynomial interpolation enables the measurement variations of FIG. 3 to be slightly attenuated, but does not enable them to be eliminated.

Another example of interpolation technique proposes to seek to locate the maximum correlation peak by identifying the zero crossing point of its derivative. This technique makes use of an order 1 interpolation that is simpler to filter afterwards. However, in practice, it proves difficult to perform satisfactory filtering of the estimations calculated in this way in real time.

A third interpolation technique example proposes compensating the interpolation error by tabulating the deviations from the actual speed. However this method brings an additional imprecision on the values of the estimated speeds.

A second method consists in compensating the time lag of the maximum correlation peak introduced by limiting the acquisition rate, the order of magnitude of the speed sought for being a priori known. This method can be performed:
- after the sampled correlation function has been calculated and having estimated the optimal acquisition frequency for the required resolution, by shifting maximum correlation peak index n just before the speed is calculated, or by estimating by how many lagging samples the maximum correlation peak will be shifted and applying this shift to the processing means, in particular on one or two channels on input to the correlator associated with the processing means.

In practice however, the techniques described above are methods that are very sensitive to the precision of estimation of the difference to be compensated. Even if the precision on the location of the maximum correlation peak is improved, the precision problems concerning determination of the estimated speed remain.

A third measurement method consists in re-interpolating the signals from sensors R and M at optimal acquisition frequency before the correlation is calculated, the order of magnitude of the speed sought for being a priori known. However, this method is still too sensitive to the quality of prediction of the optimal acquisition frequency sought for and proves somewhat inefficient.

A fourth measurement method consists in performing post-processing of the calculated estimated speed. However, conventional smoothing filters applied in real time without too large a memory do not enable the speed jumps to be smoothed, the latter being too steep.

A fifth measurement method consists in reducing the time acquisition spectrum at the level of the processing means to facilitate location of the maximum correlation peak. As the width of the maximum correlation peak is inversely proportional to the spectral band of the correlated signals, by low-pass filtering the inputs of the correlator at the level of the processing means, the width of the maximum correlation peak is increased and interpolation thereof is facilitated. It does however prove difficult in practice to construct an efficient filter, whatever the speed sought for. It proves either too broad so that the problem of sub-sampling can arise, or too fine thereby thickening the correlation too much, which results in errors on the estimation of the speeds.

In general manner, none of the known measurement techniques or methods enables precise speed measurements to be made.

OBJECT OF THE INVENTION

The object of the invention is to remedy all the drawbacks of the above-mentioned shortcomings and has the object of achieving a measurement method for measuring the displacement speed of a moving element with respect to a fixed element enabling the speed of the moving element to be determined easily and precisely, whatever the orders of magnitude of the speed and of the spatial resolution of the device implementing such a measurement method.

According to the invention, this object is achieved by the appended claims, and more particularly by the fact that, the optic measuring device comprising a first reference sensor and a plurality of distinct second measurement sensors substantially aligned along the axis of movement of the moving element, the measurement method comprises:
  determination of estimated speeds from the signals supplied by the reference sensor and each of the measurement sensors,
  and calculation of a mean speed of said estimated speeds.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

To solve the problems caused by measurement methods of the prior art, a first solution would consist in compensating the reduction of the lag (linked to the fact that the speed increases) by increasing the calculation base of the processing means correlator, i.e. by shifting measurement sensor M. Considering for example that measurement sensor M is a photosensitive detector array placed in the longitudinal direction of the speed along axis of movement A, a relatively long array has to be used to increase the correlator base. For example, with an acquisition frequency limited to 40 kHz, to keep a precision of 1.5% on the speed up to 400 km/h, the correlation base has to be doubled, i.e. a photosensitive detector array of about 180 mm is required. This solution is not however technically envisageable, as a lighted photosensitive array would have to be used over too long a distance.

With reference to the figures, the measurement method according to the invention consists in using reference sensor R and a plurality of distinct neighboring measurement sensors Mi, i being greater than or equal to two, substantially aligned in the longitudinal direction of movement, along axis of movement A. The measurement method then comprises determination of an estimated speed Ve(Mi), using the same principle as before, from the signals supplied by reference sensor R and by each of measurement sensors Mi. The measurement method finally consists in calculating the mean speed Vmean of different estimated speeds Ve(Mi) calculated beforehand. By calculating the mean of these estimated speeds Ve(Mi), the error due to discretization of the lag estimated by each measurement sensor Mi is then cancelled out.

Figure 4:
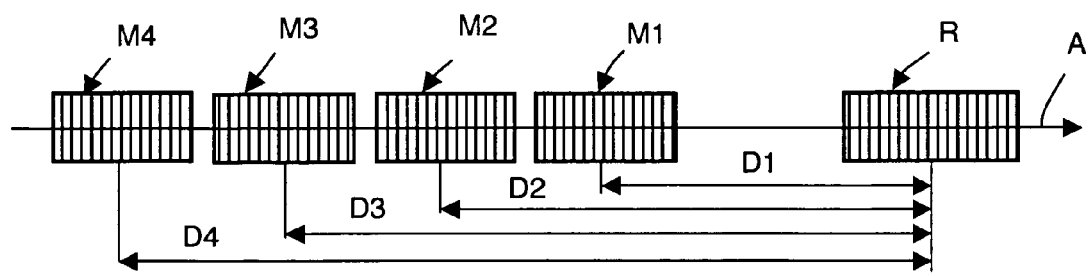
FIG. 4 very schematically represents an optic measuring device implementing a displacement speed measurement method according to the invention.

In FIG. 4, the particular embodiment of the optic measuring device implementing such a measurement method comprises a reference sensor R and four measurement sensors M1 to M4 (i ranging from 1 to 4). Sensors R and M1 to M4 are for example photosensitive arrays of coupling charge device (CCD) type and distances D1 to D4 between reference sensor R and each measurement sensor M1 to M4 are known.

The measurement method consists in determining by means of such a measuring device an estimated speed Ve(Mi) from signals supplied by the reference sensor R and each measurement sensor Mi. In the particular embodiment of FIG. 4, the method comprises determination of four estimated speeds Ve(M1), Ve(M2), Ve(M3), Ve(M4) for each measurement sensor M1 to M4, and determination of the mean speed Vmean of the four estimated speeds Ve(M1) to Ve(M4).

Figure 5:
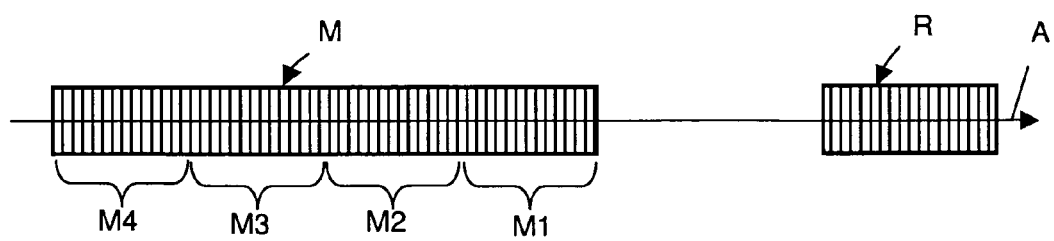
FIG. 5 very schematically represents an optic measuring device implementing an alternative embodiment of a displacement speed measurement method according to the invention.

The alternative embodiment of FIG. 5 differs from the embodiment of FIG. 4 by measurement sensors Mi taken into account to determine the estimated speeds Ve(Mi). In FIG. 5, the measuring device comprises a single measurement sensor M. Reference sensor R and measurement sensors M are for example photosensitive arrays composed of a plurality of elementary components, or pixels. Four successive and adjacent groups of distinct elementary components constitute measurement sensors M1, M2, M3 and M4, distances D1 to D4 between reference sensor R and measurement sensors M1 to M4 being known. Each measurement sensor Mi can comprise a single elementary component or a plurality of adjacent elementary components, as represented in FIG. 5. Determination of the mean speed Vmean is performed in the same way as before by calculating the mean of the estimated speeds Ve(M1), Ve(M2), Ve(M3), Ve(M4), calculated beforehand for each measurement sensor M1 to M4.

Figure 9:
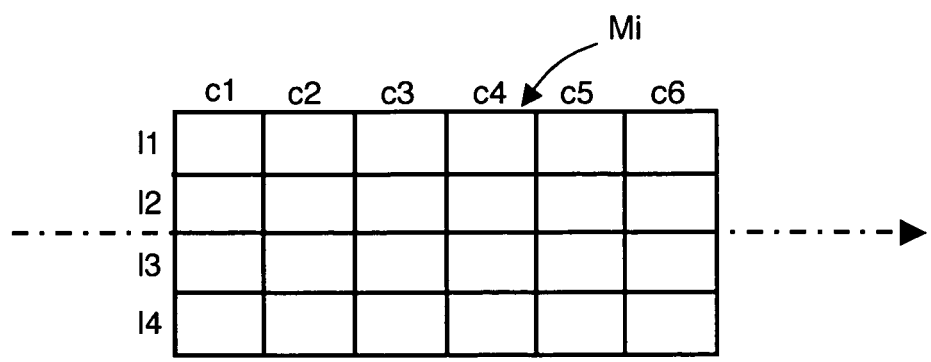
FIG. 9 very schematically represents a sensor of a measuring device implementing an alternative embodiment of a displacement speed measurement method according to the invention.

In a general manner, reference sensor R and/or measurement sensors Mi can be formed by at least a part of a matrix of elementary components of n lines and m columns, n and m being greater than or equal to 1. As represented schematically in FIG. 9, a measurement sensor Mi can be formed by a matrix of elementary components comprising for example four lines I1 to I4 and six columns c1 to c6.

The use of such matrices of elementary components in particular enables the feasibility of the measurement method to be improved. It is in fact easier to handle large surfaces of elementary components rather than separate elements. The precision of the measurement method is also improved, the elementary components of the matrix thereby being aligned with one another. Furthermore, the cost of such a measurement method is also optimized, the use of a complete matrix of elementary components being more economical than fabrication of arrays or cutting of a matrix, and operation of the measurement method is also optimized in so far as it is possible to cumulate a large quantity of light detected by a large number of different sensors.

In a general manner, measurement methods according to the prior art propose making a plurality of measurements but always considering the same measurement sensor M. This results in an identical error occurring at each measurement. The measurement method according to the invention proposes making a plurality of measurements but considering a different measurement sensor Mi at each new measurement. Calculating the corresponding estimated speed Ve(Mi) for each measurement sensor Mi presents an error, but this is compensated by the set of errors generated by calculation of the estimated speeds Ve(Mi) of all the measurement sensors Mi. The mean of these estimated speeds Ve(Mi) then enables the errors of each sensor Mi to be attenuated, or even to be compensated and completely eliminated.

Figure 6:
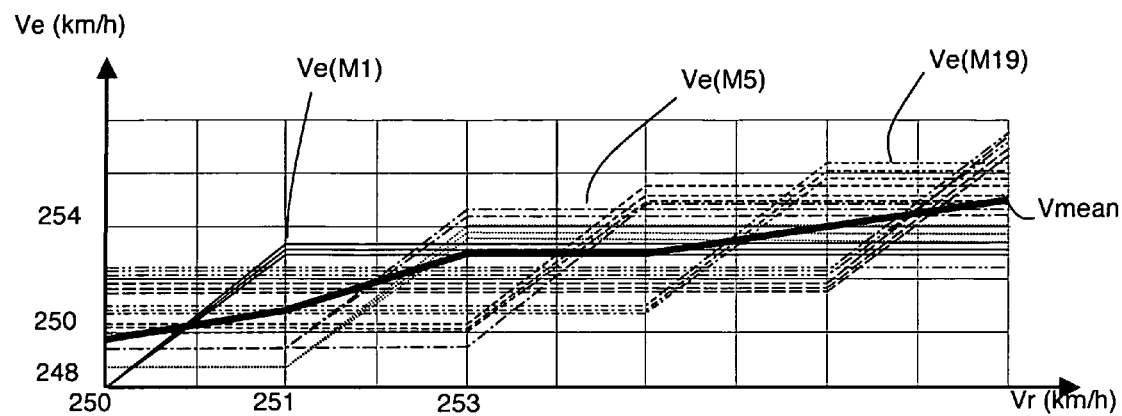
FIG. 6 is a graph representing estimated speed versus actual speed for the estimated speeds of measurement sensors and for the mean speed of these estimated speeds, for a measurement method according to FIGS. 4 and 5.

Indeed, as illustrated in FIG. 6 representing the estimated speed Ve in km/h versus the actual speed Vr in km/h for twenty-one distinct measurement sensors M1 to M21, the estimated speeds Ve(Mi), i ranging from 1 to 21, are measured for an actual speed Vr comprised between 250 km/h and 255 km/h, with a limit acquisition frequency of about 40 kHz.

For each value of the estimated speed Ve(Mi), i ranging from 1 to 21, the estimation of the estimated speed Ve(Mi) jumps several km/h per plateau. This plateau is substantially identical for each estimated speed Ve(Mi) and corresponds substantially to the order of magnitude of the measurement variations observed on the speed gradient of FIG. 3. For example, the plateau is about 4 km/h in the particular embodiment of FIG. 3.

This discretization plateau does not occur at the same actual speed for the different measurement sensors Mi. For example, the estimated speed Ve(M1), represented in a fine unbroken line in FIG. 6, goes from 248 km/h to about 253 km/h between the actual speeds of 250 km/h and 251 km/h. The estimated speed Ve(M5), represented by a broken line in FIG. 6, goes from 249 km/h to 254 km/h between the actual speeds of 251 km/h and 253 km/h. The estimated speed Ve(M19), also represented by a broken line in FIG. 6, goes from 251 km/h to about 256 km/h between the actual speeds of 255 km/h and 257 km/h.

This discretization effect therefore does not occur at the same speed for all the measurement sensors Mi, distances D1 to D21 between reference sensor R and measurement sensors M1 to M21 all being different. By using the different sensors R and Mi, the plateaus are shifted and the errors observed on each measurement sensor are compensated to give a substantially straight mean speed Vmean, represented by the thick black line in FIG. 6. This mean speed Vmean approaches an ideal theoretical line making the actual speed and the calculated speed coincide.

Figure 7:
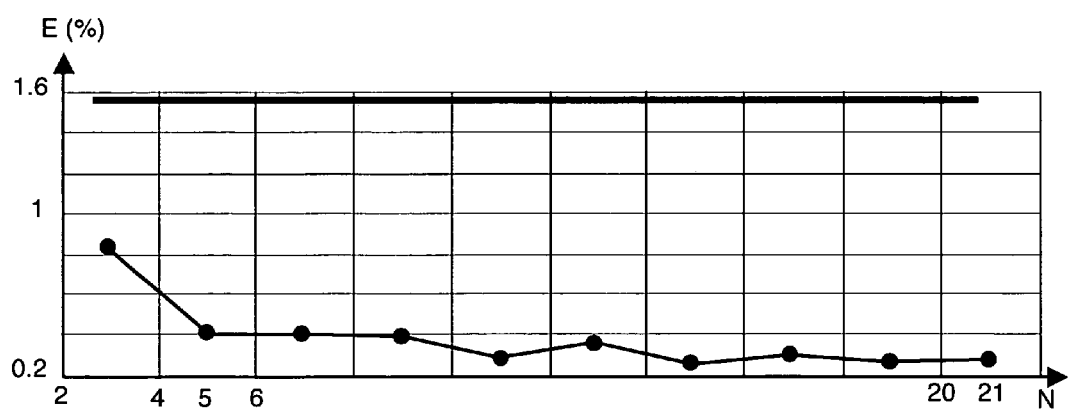
FIG. 7 is a graph illustrating the maximum relative error on the estimated speeds versus the number of measuring sensors, for the measurement method according to FIGS. 4 to 6.

Such a measurement method determining a mean speed Vmean taking a plurality of estimated speeds Ve(Mi) into account thereby enables errors to be considerably reduced. As represented in FIG. 7 illustrating the maximum relative error E on the speed versus the number of estimated speeds N taken into account for calculation of the mean speed Vmean, the maximum relative error observed with a single estimated speed corresponding to a single measurement sensor, represented by a thick unbroken line, is about 1.6%, i.e. about 6 km/h for a speed of 400 km/h. The error is continuous, for each measurement is made with the same measurement sensor. On the other hand, when at least five estimated speeds are made with five different sensors, it can be noted that the relative error E drops below 0.5%, towards 0.4%, and can even drop as low as 0.3% with twenty-one estimated speeds.

Figure 3:
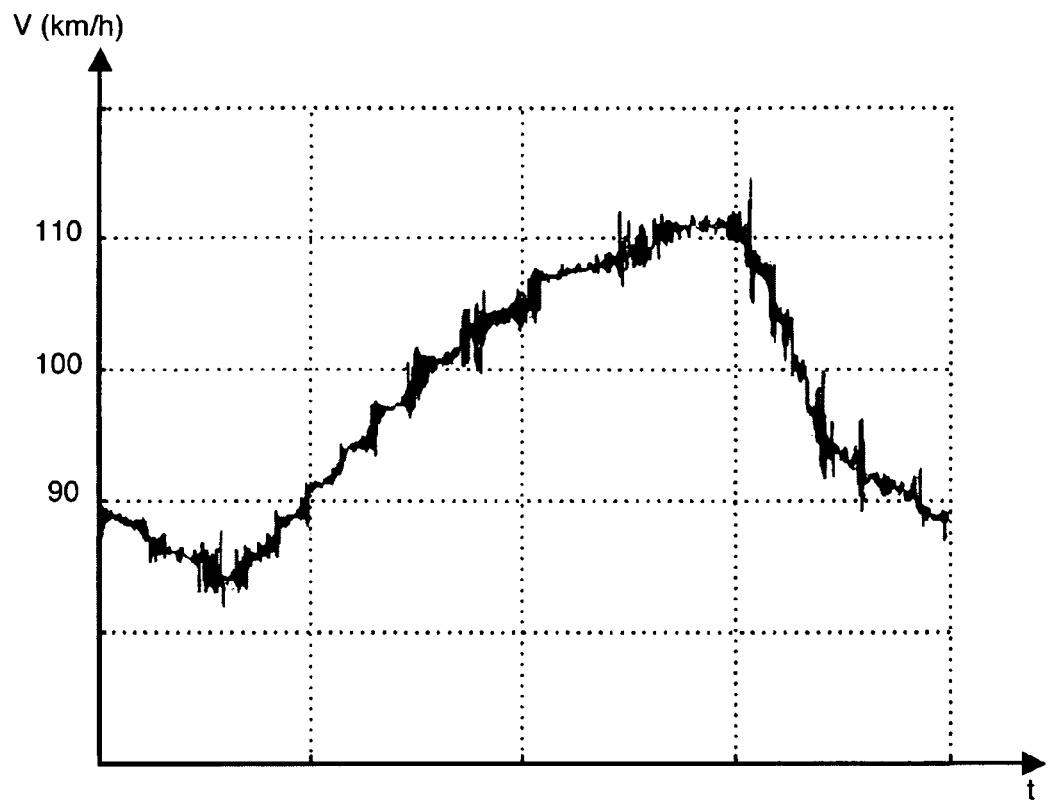
FIG. 3 is a graph representing speed versus time, when recording a speed gradient of a measurement method according to FIGS. 1 and 2.
Figure 8:
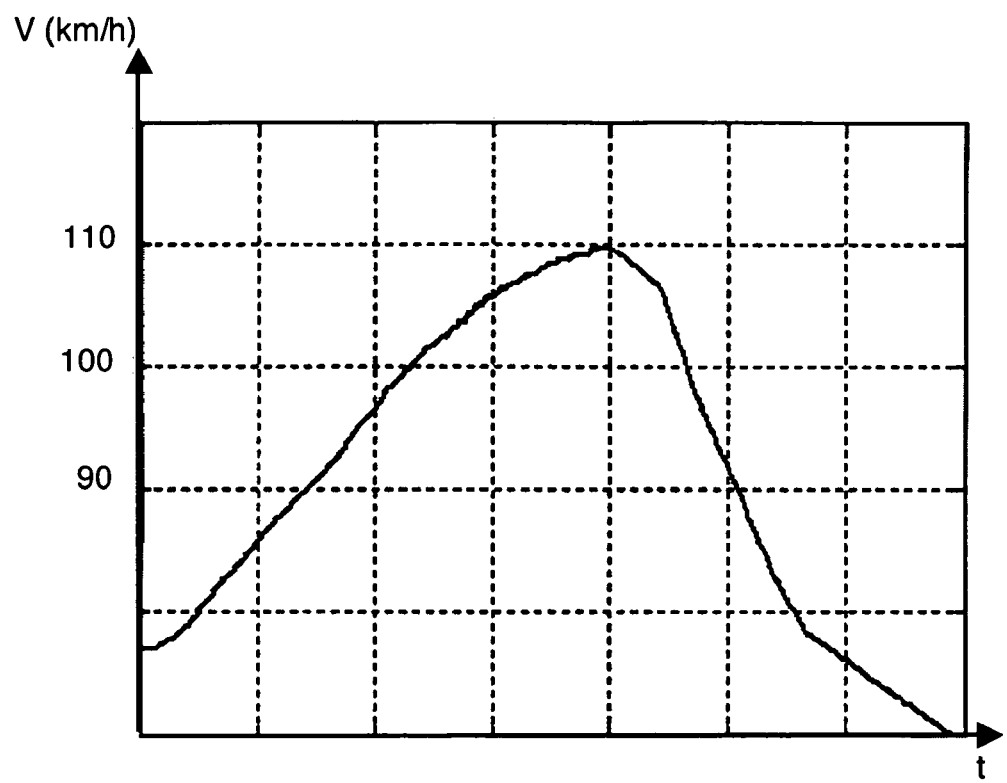
FIG. 8 is a graph representing speed versus time, when recording a speed gradient of a measurement method according to FIGS. 4 to 7.

This error reduction phenomenon is expressed in particular by an almost complete attenuation of the measurement variations and a much greater precision on the speed estimations. In FIG. 8 illustrating the speed versus time, when a speed gradient with the same characteristics as in FIG. 3 is recorded, i.e. with a maximal acquisition frequency of 9 kHz and a spatial resolution of 1.5 mm, eight estimated speed values (and therefore eight measurement sensors M1 to M8) enable a much smoother and more precise curve to be obtained, after the mean speed Vmean has been calculated. The imprecision linked to sampling at 110 km/h is practically eradicated.

Whatever measurement sensors Mi are used, such a measurement method therefore enables a very great precision in estimating the speed of a moving element with respect to a fixed element to be obtained. Moreover, such a method offers the user the possibility of giving an index of reliability on the calculated estimation according to the number of correct estimations made on each measurement sensor.

For example, the method gives an index of reliability of N if the N speed estimations obtained with the N sensors Mi are similar (excluding the discretization error) and the method gives an index of reliability of 1 if only one of the N speed estimations obtained with the N sensors Mi seems correct.

The invention is not limited to the different embodiments described above. The measurement method can apply when the acquisition frequency is not limited, in order to improve the estimation precision.

Figure 1:
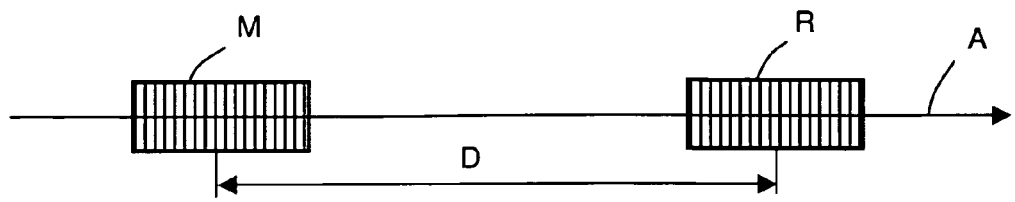
FIG. 1 very schematically represents an optic measuring device implementing a displacement speed measurement method according to the prior art.
Figure 2:
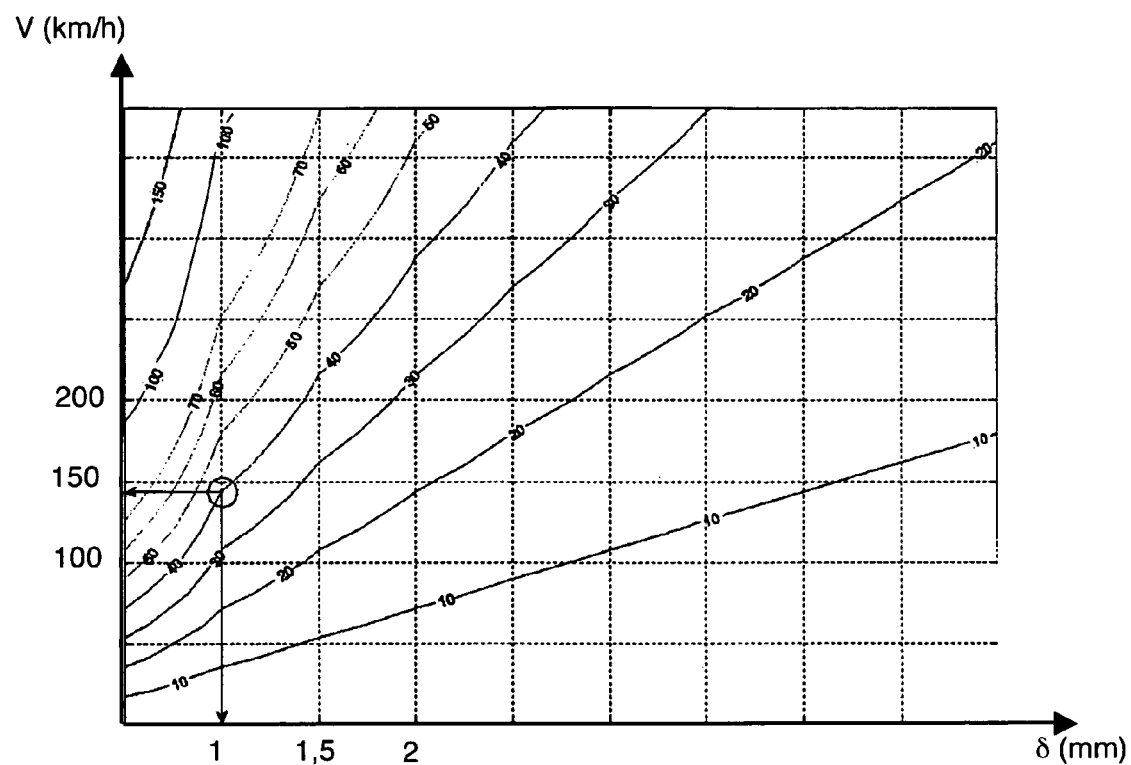
FIG. 2 is a graph representing speed versus spatial resolution for different acquisition frequencies of a measurement method according to the prior art.

Furthermore, reference sensor R and measurement sensors Mi of the optic device implementing one such measurement method can be aligned, as represented in FIGS. 1, 4 and 5, or they can be arranged substantially perpendicularly. For example, reference sensor R is positioned perpendicularly to axis of movement A, and measurement sensors Mi are aligned and arranged along axis of movement A perpendicularly to reference sensor R. Such a configuration in particular enables the transverse speed of the moving element to be measured, in addition to the longitudinal speed.

Such a measurement method applies in particular for measuring the speed of a motor vehicle on the ground, the measuring device being fixed indifferently either on the ground or onto the underside of the vehicle. Another application can be calculating the running speed and the height of objects on production lines (final sorting, recognition of manufactured objects, etc). Another application can also be measuring the running speed of wires or rods in textile production lines (spinning, weaving, rolling machines, etc).

The invention claimed is:

1. A device for measuring the speed between a moving element and a reference element, comprising:
   a reference sensor;
   a plurality of distinct measurement sensors substantially aligned along an axis of movement of the moving element, wherein the distances between the reference sensor and each of the measurement sensors are different; and
   processing means comprising:
      means for determining, for each of the measurement sensors, a respective temporal position of a maximum correlation peak by correlating a signal supplied by the reference sensor and a signal supplied by the measurement sensor;
      means for determining, for each of the measurement sensors, an estimated speed according to the distance between the reference sensor and the measurement sensor, and the respective temporal position of the maximum correlation peak; and
      means for calculating a mean value of said estimated speeds.

2. The device according to claim 1, wherein two adjacent measurement sensors comprise adjacent groups of photosensitive elements of the same array.

3. The device according to claim 1, wherein two adjacent measurement sensors are formed by two distinct arrays.

4. The device according to claim 1, wherein each of said sensors comprises an array of photosensitive elements oriented along the axis of movement.

5. The device according to claim 1, wherein each of said sensors comprises a matrix of photosensitive elements.

6. A measurement method for measuring the speed of a moving element with respect to a reference element by means of a measuring device fixed to the first of the moving and reference elements, comprising a reference sensor and a plurality of distinct measurement sensors substantially aligned along an axis of movement of the moving element and oriented to detect light diffused by the second of the moving and reference elements, wherein the distances between the reference sensor and each of the measurement sensors are different, the method comprising the following steps:
   illuminating the second element;
   determining, for each of the measurement sensors, a respective temporal position of a maximum correlation peak by correlating a signal supplied by the reference sensor and a signal supplied by the measurement sensor;
   determining, for each measurement sensors, an estimated speed according to the distance between the reference sensor and the measurement sensor, and the respective temporal position of the maximum correlation peak; and
   calculating a mean value of said estimated speeds.

7. A device for measuring the speed between a moving element and a reference element, comprising:
   a reference sensor;
   a plurality of distinct measurement sensors substantially aligned along an axis of movement of the moving element, wherein the distances between the reference sensor and each of the measurement sensors are different; and
   a processor configured to determine, for each of the measurement sensors, a position of a maximum correlation peak by correlation of signals supplied by the reference sensor and the measurement sensor, and an estimated speed according to the distance between the reference sensor and the measurement sensor and said position of the maximum correlation peak, wherein
   the processor is configured to calculate a mean speed of the estimated speeds.

* * * * *